(12) United States Patent
Garofalo

(10) Patent No.: US 9,324,086 B2
(45) Date of Patent: *Apr. 26, 2016

(54) METHOD OF SHARING MULTI-MEDIA CONTENT AMONG USERS IN A GLOBAL COMPUTER NETWORK

(75) Inventor: Michael Garofalo, Howell, NJ (US)

(73) Assignee: MINDTRIG.COM Limited Liability Company, Jackson, NJ (US)

( * ) Notice: Subject to any disclaimer, the term of this patent is extended or adjusted under 35 U.S.C. 154(b) by 788 days.

This patent is subject to a terminal disclaimer.

(21) Appl. No.: 13/531,615

(22) Filed: Jun. 25, 2012

(65) Prior Publication Data

US 2012/0266086 A1 Oct. 18, 2012

Related U.S. Application Data

(63) Continuation of application No. 12/146,839, filed on Jun. 26, 2008, now Pat. No. 8,209,618.

(60) Provisional application No. 60/946,336, filed on Jun. 26, 2007, provisional application No. 61/037,892, filed on Mar. 19, 2008.

(51) Int. Cl.
 *G06F 3/14* (2006.01)
 *G06Q 30/02* (2012.01)
 *G06Q 10/06* (2012.01)

(52) U.S. Cl.
 CPC .......... *G06Q 30/02* (2013.01); *G06Q 10/06398* (2013.01); *G06Q 30/0276* (2013.01)

(58) Field of Classification Search
 CPC ..................................... G06F 3/14; G06F 3/17

USPC ......................................................... 715/753
See application file for complete search history.

(56) References Cited

U.S. PATENT DOCUMENTS

| 6,976,028 | B2 | 12/2005 | Fenton et al. |
| 7,162,433 | B1 | 1/2007 | Foroutan |
| 2001/0049821 | A1 | 12/2001 | Ochi |
| 2002/0059621 | A1 | 5/2002 | Thomas et al. |

(Continued)

OTHER PUBLICATIONS

Meeyoung Cha, Haewoon Kwak, Pablo Rodriguez, Yong-Yeol Ahn, and Sue Moon, I Tube, You Tube, Everybody Tubes: Analyzing the World's Largest User GeneratedContent Video System, Oct. 24-26, 2007, IMC 07.

(Continued)

*Primary Examiner* — Ruay Ho
(74) *Attorney, Agent, or Firm* — Lerner, David, Littenberg, Krumholz & Mentlik, LLP

(57) ABSTRACT

In one embodiment of the present invention, a method for sharing multi-media content among a plurality of users in a computer network comprises creating a plurality of user accounts, each of said user accounts corresponding to one of the plurality of users, and having a plurality of interactive features including a first feature that permits the user to upload the multi-media content to the computer network; forming a user network including one or more of the plurality of user accounts in communication with one or more other user accounts and to the uploaded multi-media content via the computer network; categorizing the uploaded multi-media content in accordance with the subject matter of the uploaded multi-media content; organizing the uploaded multimedia content in a competitive format; and establishing a hierarchy for the uploaded multi-media content within the competitive format as a function of a competitive measurement system.

13 Claims, 13 Drawing Sheets

(56) References Cited

U.S. PATENT DOCUMENTS

| | | | |
|---|---|---|---|
| 2002/0083124 | A1 | 6/2002 | Knox et al. |
| 2002/0116716 | A1 | 8/2002 | Sideman |
| 2004/0225728 | A1 | 11/2004 | Huggins et al. |
| 2005/0281470 | A1 | 12/2005 | Adams |
| 2006/0048186 | A1 | 3/2006 | Alterman |
| 2007/0038717 | A1 | 2/2007 | Burkholder et al. |
| 2007/0186230 | A1 | 8/2007 | Foroutan |
| 2007/0244570 | A1 | 10/2007 | Speiser et al. |
| 2007/0244585 | A1 | 10/2007 | Speiser et al. |
| 2007/0244749 | A1 | 10/2007 | Speiser et al. |
| 2008/0004946 | A1 | 1/2008 | Schwarz |

OTHER PUBLICATIONS

International Search Report and Written Opinion for International Application No. PCT/US2008/068336, filed 26 Jun. 2008, published as WO 2009/003097 on Dec. 31, 2008.

International Preliminary Report on Patentability for International Application No. PCT/US2008/068336, tiled on Jun. 26, 2008.

Brief in Support of Defendant's Motion for Attorney's Fees, *Garfum.com Corporation* vs. *Reflections by Ruth D/B/A Bytephoto.com*, Case No. 1:14-cv-05919, filed Jun. 22, 2015, 13 portion of brief provided relating to validity of U.S. Pat. No. 8,209,618.

Brief in Support of Defendant's Motion to Dismiss Plaintiff's Complaint for Patent Infringement, *Garfum.com corporation* vs. *Reflections by Ruth D/B/A Bytephoto.com*, Case No. 1:14-cv-0519-JEI-KMW, filed Feb. 13, 2015, 24 pages.

Document Identifying litigation relating to U.S. Pat. No. 8,209,618 in U.S. District Court, Civil Docket for Case # 1:14-cv-05919, *Garfum.com Corporation* vs. *Reflections by Ruth*, date filed: Sep. 23, 2014.

Document Identifying litigation relating to U.S. Pat. No. 8,209,618 in U.S. District Court, Civil Docket for Case # 3:14-cv-05921, *Garfum.com Corporation* vs. *Ourstage, Inc.*, date filed: Sep. 23, 2014.

Document Identifying litigation relating to U.S. Pat. No. 8,209,618 in U.S. District Court, Civil Docket for Case # 3:14-cv-05922, *Garfum.com Corporation* vs. *Skinnycorp, LLC*, date filed: Sep. 23, 2014.

Document Identifying litigation relating to U.S. Pat. No. 8,209,618 in U.S. District Court, Civil Docket for Case # 3:14-cv-05923, *Garfum.com Corporation* vs. *Golozo, LLC*, date filed: Sep. 23, 2014.

Plaintiff's Opposition to Defendant's Motion for Fees, *Garfum.com Corporation* vs. *Reflections by Ruth D/B/A Bytephoto.com*, Civil Action No. 1:14-cv-05919, filed Jul. 27, 2015, 26 pages.

Reply Brief in Support of Defendant's Motion for Attorney's fees, *Garfum.com Corporation* vs. *Reflections by Ruth D/B/A Bytephoto.com*, Case No. 1:14-cv-05919, filed Aug. 3, 2015, 19 pages.

METHOD OF SHARING MULTI-MEDIA CONTENT AMONG USERS IN A GLOBAL COMPUTER NETWORK

RELATED APPLICATION DATA

This application claims priority to pending U.S. patent application Ser. No. 12/146,839, filed Jun. 26, 2008, which claims priority to U.S. Provisional Application Ser. No. 60/946,336, filed Jun. 26, 2007, and U.S. Provisional Application Ser. No. 61/037,892, filed Mar. 19, 2008, the disclosures of which are incorporated herein by reference in their entirety.

BACKGROUND

1. Technical Field

Embodiments of the present invention generally relate to a method for sharing multi-media content among users in a global computer network. More specifically, embodiments of the present invention relate to a method for managing an interactive computer network involving user-submitted multi-media content in a competitively structured format.

2. Description of the Related Art

Social interaction on computer networks has increased in popularity since the time when computer users first communicated with one another over a telecommunication connection. What started with electronic messages exchanged on the dial-in bulletin board systems ("BBS") in the early 1980 s has blossomed into a variety of "online communities," such as, for example, chat rooms, on-line forums, web logs ("blogs"), as well as specialty Web sites that are dedicated to particular subjects, e.g., digital photographs. As data transfer rates continue to increase in step with the improvements in high speed data transfer technology, so too does the demand for computer networks that provide individuals with more interactive and creative features.

Some computer networks have tried to incorporate these features. Some are set-up in a manner that provides the user with tools and functions that facilitate communication between the users. They permit individuals to meet, talk, share ideas, and become acquainted without the users ever leaving the comfort of their own home. Typically these computer networks allocate storage space so that users can create, store and share information. This space is hosted by the computer network and available to anyone in the public domain with access to the Internet. Even more advanced computer networks permit users to identify individuals with distinct labels, such as, "friends," "buddies," and "links," among others. These labels help the user to organize their contacts, whether personal friends, relatives, or individuals in which they share a common interest, into a "social network." Such social networks simplify communication because the user can choose the individuals to whom they communicate regularly. But, computer networks that simply offer the user an scheme to organize those individuals to whom they send messages, chat, and share personal information, does not meet the needs of the users that wish to use their social network for higher-level interaction that involves complex data and information, like audio, videos, and images.

Thus, there is a need for an improved interactive portal that permits users to share such content in a social network setting and that utilizes this content in a manner to increase the interaction between the users of the portal.

SUMMARY

Embodiments of the present invention relate to a method for managing an interactive computer network involving user-submitted multi-media content in a competitively structured format. In one embodiment of the present invention, a method for sharing multi-media content among a plurality of users in a computer network comprises creating a plurality of user accounts, each of said user accounts corresponding to one of the plurality of users, and having a plurality of interactive features including a first feature that permits the user to upload the multi-media content to the computer network; forming a user network including one or more of the plurality of user accounts in communication with one or more other user accounts and to the uploaded multi-media content via the computer network; categorizing the uploaded multi-media content in accordance with the subject matter of the uploaded multi-media content; organizing the uploaded multi-media content in a competitive format; and establishing a hierarchy for the uploaded multi-media content within the competitive format as a function of a competitive measurement system; wherein the competitive measurement system includes a rating measure assigned to the uploaded multi-media content by the users via the computer network.

In another embodiment of the present invention, a method of facilitating an online contest within a computer network comprises creating a plurality of user accounts, each of the user accounts corresponding to one of the plurality of users, and having a plurality of interactive features including a first feature that permits the user to upload the multi-media content to the computer network; providing a user interface for the users to access the first interactive feature, the user interface including an embedded multi-media player adapted for viewing the uploaded multi-media content; categorizing the uploaded multi-media content in accordance with the subject matter of the uploaded multi-media content; organizing the uploaded multi-media content in a competitive format having a plurality of competitive rounds based on the quantity of multi-media content being organized; and applying a competitive measurement system to advance particular uploaded multimedia through the plurality of competitive rounds; wherein the competitive measurement system includes a rating measure assigned to the uploaded multi-media content by the users via the computer network.

In yet another embodiment of the present invention, a computer readable medium comprising a computer program having executable code, the computer program for enabling an interactive multi-media network, the computer program comprises a first set of instructions for creating a plurality of user accounts, each of the user accounts corresponding to one of the users and having a plurality of interactive features including a first feature that permits the user to upload the multi-media content to the computer network; a second set of instructions for forming a user network including one or more of the user accounts in communication with one or more other user accounts and to the uploaded multi-media content via the computer network; a third set of instructions for categorizing the uploaded multi-media content in accordance with a genre selected by the user based on the subject matter of the uploaded multi-media content; a fourth set of instructions for organizing the uploaded multi-media content in a competitive format in a manner consistent with the genre; and a fifth set of instructions for establishing a hierarchy for the uploaded multi-media content within the competitive format as a function of a competitive measurement system, wherein the competitive measurement system includes a rating measure assigned to the uploaded multi-media content by the users after viewing the uploaded multi-media content via the computer network.

BRIEF DESCRIPTION OF THE DRAWINGS

So the manner in which the above recited features of the present invention can be understood in detail, a more particular description of embodiments of the present invention, briefly summarized above, may be had by reference to embodiments, several of which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein:

FIG. 6 is a screenshot of the GUI of FIG. 3 illustrating an example of the challenger link of the interactive portal;

Figure 1:
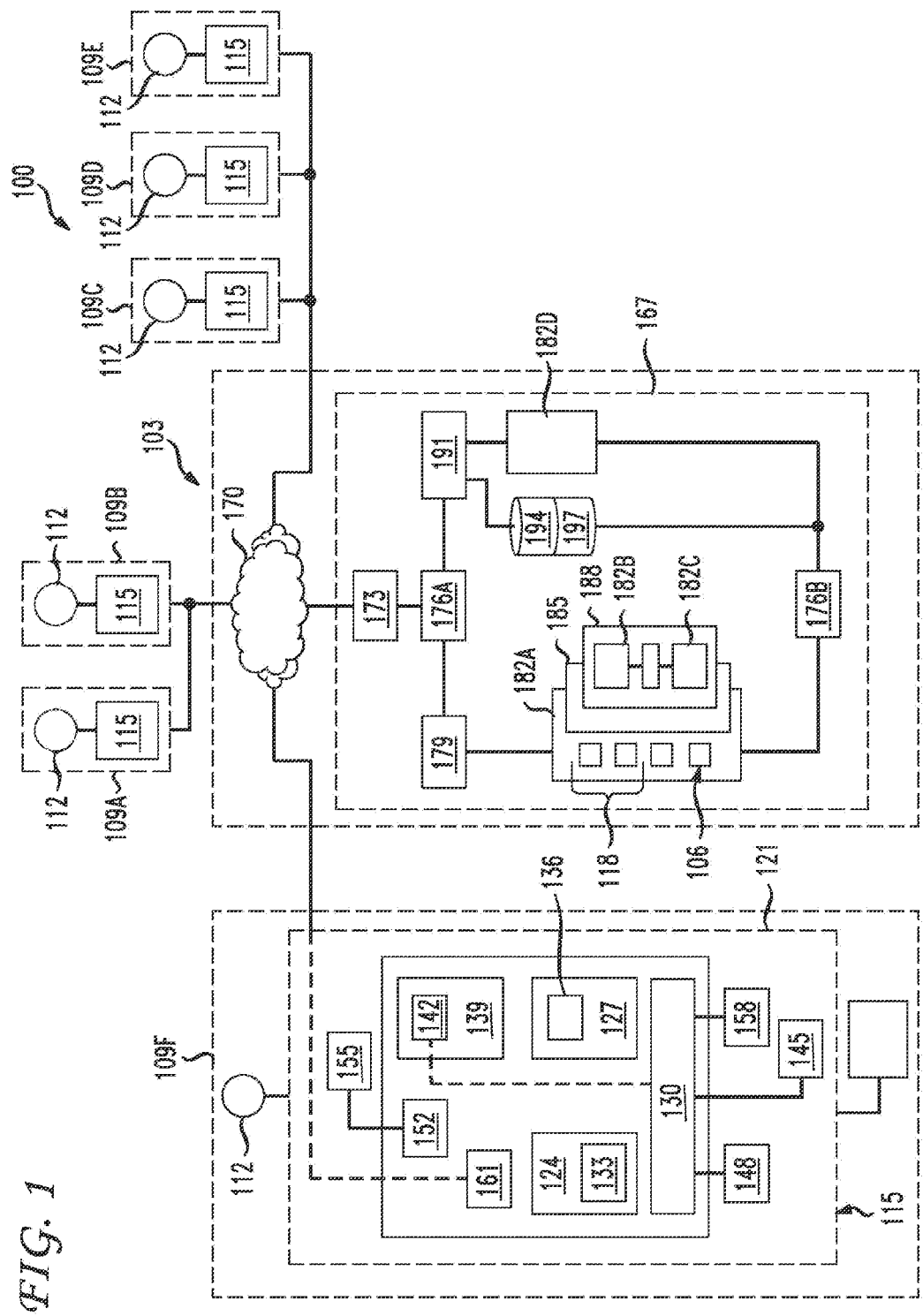
FIG. 1 illustrates a schematic diagram of the components in an example of an interactive portal that is made in accordance with the concepts of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to a method for sharing multi-media content among users in a global computer network. More specifically, embodiments of the present invention relate to a method for managing an interactive computer network involving user-submitted multi-media content in a competitively structured format.

Systems that are designed in accordance with the present invention are configured in a manner that permits the users to communicate with other users via electronic mechanisms (e.g., email, chat, text messages) in the context of a social network setting. These systems, however, permit the users to share digital content with the other users of the system. This includes video content, audio content, and image content that typically is not supported by the computer networks discussed in the Background section above. More particularly, a feature of the systems described herein organize the shared content so as to cause the users that provide the shared content to receive rewards, e.g., monetary rewards, and/or other distinctions. More details and an example of the method employed by the embodiments of these systems to select and arrange the shared content will be discussed in more detail below in connection with FIG. 4 below. Before continuing with that discussion, however, a general discussion of the architecture of the system as discussed in connection with FIG. 1, follows immediately below.

Referring now to the drawings, FIG. 1 illustrates the general architecture of an example of an interactive portal 100 that operates in accordance with concepts of the present invention. Interactive portal 100 is described herein as an online computer network that connects users in a social network environment. More particularly, interactive portal 100 of FIG. 1 includes a computer network 103 with content 106 that is accessible to users 109, e.g., users 109A-F, via a user interface 112. The interface is presented to users 109 on computing machines 115 that are connected to computer network 103. Examples of content that content 106 can be include, but are not limited to, multi-media content (e.g., data, music, video, and images), software content (e.g., downloadable/executable programs), and Internet content (e.g., Web sites), among others. In many embodiments, content 106 also includes shared content 118 that includes, but is not limited to, video data, audio data, image data, and other digital data that users 109 can upload onto computer network 103 via user interface 112. As discussed in more detail below, the data that is shared by users 109 may include, for example, music videos, audio recordings, comedy routines, short films, blooper videos, and other homemade digital recordings and pictures that are created, captured, or otherwise acquired by users 109.

It will be understood by those having ordinary skill in the art that certain concepts and implementations of interactive portal 100 described herein may be conveniently implemented using one or more computing machine 115 that are programmed according to the teachings of the present specification, as will be apparent to those of ordinary skill in the computer art. For example, various aspects of a method for sharing multi-media content using an interactive interface described herein, may be implemented as machine-executable instructions (i.e., software coding), such as program modules executed by one or more machines.

Typically a program module may include routines, programs, objects, components, date structures, etc. that perform specific tasks. Appropriate machine-executable instructions can readily be prepared by skilled programmers based on the teachings of the present disclosure, as will be apparent to those of ordinary skill in the software art. Such executable software may be a computer program product that employs a machine-readable medium. Example computer programs include, but are not limited to, an operating system, a browser application, a micro-browser application, a proxy application, a business application, a server application, an email application, an online service application, an interactive television client application, an ISP client application, a gateway application, a tunneling application, and any combinations thereof. A computer-readable medium may be any medium that is capable of storing and/or encoding a sequence of instructions for execution by a machine (e.g., a computing device) and that causes the machine to perform any one of the methodologies and/or embodiments described herein. Examples of a computer-readable medium include, but are not limited to, a magnetic disk (e.g., a conventional floppy disk, a hard drive disk), an optical disk (e.g., a compact disk "CD", such as readable, writeable, and/or re-writeable CD; a digital video disk "DVD", such as a readable, writeable, and/or rewriteable DVD), a magneto-optical disk, a read-only memory "ROM device, a random access memory "RAM" device, a magnetic card, an optical card, a solid-state memory device (e.g., a flash memory), an EPROM, and EEPROM, and any combinations thereof. A computer-readable medium, as used herein, is intended to include a single medium as well as a collection of physically separate media, such as, for example, a collection of compact disks or one more hard disk drives in combination with a computer memory.

User interface 112, for example, may conform to a set of machine-executable instructions that is implemented on computing machines 115 and that facilitate the interaction of users 109 via computer network 103. These instructions may include instructions and/or program modules that permit users 109 to upload, download, stream, modify, and/or manipulate shared content 118. In one embodiment of interactive portal 100, user interface 112 provides a graphical user interface (GUI) that has graphical icons, visual indicators, and other graphical elements that correspond to the various features, functions, and operations of interactive portal 100. An example of interactive portal 100 includes such machine-executable instructions so as to cause users 109 to access content 106, including shared content 118, of interactive portal 100 via a Web browser or similar browser-type applications. These are well-known in the art. Another embodiment of interactive portal 100 includes machine-executable instructions for user interface 112 that are implemented as embedded software on computing machines 115. This interface may have icons, access bars, access panels, and/or other selectable feature. Often, the embedded software permits users 109 to connect to the content 106 of interactive portal 100 without the use of a Web browser. Still other examples of interactive portal 100 include machine-executable instructions for user interface 112 that permit users 109 to access content 106 via content delivery services, e.g., cable services, satellite services, fiber optic, DSL, and other digital and/or high speed data transmission technologies. An example of a user interface that is suited for use as user interface 112 of the embodiments of interactive portal 100 will be discussed in more detail in connection with FIG. 3 below.

Computing machines 118 that are used by users 109 will be generally recognized in the art. Examples of machines for use as computing machines 118 include, but are not limited to, a general purpose computer; a special purpose computer; a computer workstation; a terminal computer; a notebook/laptop computer; a server computer; a handheld device (e.g., tablet computer, a personal digital assistant "PDA", a mobile telephone, etc.); a web appliance; a network router; a network switch; a network bridge; a set-top box "STB"; video tape recorder "VTR"; a digital video recorder "DVR"; a digital video disc "DVD" device (e.g., a DVD recorder, a DVD reader); any machine, component, tool, equipment capable of executing a sequence of instructions that specify an action to be taken by that machine, and any combinations thereof. In one example, a computing device may include and/or be included in, a kiosk. In another example, a computing device includes a mobile device. In yet another example, a computing device includes a device configured for display of video and/or audio content accessed over a network.

In the present example of interactive portal 100, users 109 access the interactive portal via computing machines 109, each in the form of a computer system 121 within which a set of instructions for causing the computing device to perform any one or more of the aspects and/or methodologies of the present disclosure may be executed. It should be noted that although computer system 121 itself and its components may be shown as singular entities, each component and computer system 121 may include any number of components configured to perform one or more certain functionalities. For example, multiple computer systems 121 may combine to perform any one or more of the aspects and/or methodologies of the present disclosure. Additionally any one aspect and/or methodology of the present disclosure may be dispersed across any number of computer network 105 or across any number of computer system components.

Computer system 121 includes a processor 124 and a memory 127 that communicate with each other, and with other components, via a bus 130. Bus 130 may include any of several types of bus structures including, but not limited to, a memory bus, a memory controller, a peripheral bus, a local bus, and any combinations thereof, using any of a variety of bus architectures. Memory 127 may include various components (e.g.; machine readable media) including, but not limited to, a random access memory component (e.g., a static RAM "SRAM", a dynamic RAN "DRAM", etc.) a read only component, and any combinations thereof. In one example, a basic input/output system 133 (BIOS), including basic routines that help to transfer information between elements within computer system 121, such as during start-up, may be stored in memory 127. Memory 127 may also include (e.g., stored on one or more machine-readable media) instructions 136 (e.g., software) embodying any one or more of the aspects and/or methodologies of the present disclosure. In another example, memory 127 may further include any number of program modules including, but not limited to, an operating system, one or more application programs, other program modules, program data, and any combinations thereof.

Computer system 121 may also include a storage device 139. Examples of a storage device (e.g., storage device 139) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 139 may be connected to bus 130 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 139 may be removably interfaced with computer system 121 (e.g., via an external port connector (not shown)). Particularly, storage device 139 and an associated machine-readable medium 142 may provide nonvolatile and/or volatile storage of machine-readable instructions, data structures, program modules, and/ or data for computer system 121. In one example, software 136 may reside, completely or partially, within machine-readable medium 142. In another example, software 136 may reside, completely or partially, within processor 124.

Computer system 121 may also include an input device 145. In one example, user 109 of computer system 121 may enter commands and/or other information into computer system 121 via input device 145. For example, user 109 may utilize a computing device with an input device, such as input device 145 to enter information corresponding to the personal information that is solicited by one or more screens of user interface 112 of interactive portal 100 of FIG. 1. Examples of an input device 145 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Still other examples of an input device include a storage device 148 (e.g., a removable disk drive, a flash drive, etc.). Input device 145 may be interfaced to bus 130 via any of a variety of interfaces (not shown) including, but not limited to, a serial interface, a parallel interface, a game port, a USB interface, a FIREWIRE interface, a direct interface to bus 130, and any combinations thereof.

Computer system 121 may further include a video display adapter 152 for communicating a displayable image to a display device, such as display device 155. For example, video display adapter 152 may be utilized to display an interface for accessing one or more content items over a network to display device 155. Examples of a display device include, but are not limited to, a liquid crystal display (LCD), a cathode ray tube (CRT), a plasma display, and any combinations thereof. In addition to a display device, a computer system 121 may include one or more other peripheral output devices including, but not limited to, an audio speaker, a printer, and any combinations thereof. Such peripheral output devices may be connected to bus 130 via a peripheral interface 158. Examples of a peripheral interface include, but are not limited to, a serial port, a USB connection, a FIREWIRE connection, a parallel connection, and any combinations thereof.

A digitizer (not shown) and an accompanying pen/stylus, if needed, may be included in order to digitally capture freehand input. A pen digitizer may be separately configured or coextensive with a display area of display device 155. Accordingly, a digitizer may be integrated with display device 155, or may exist as a separate device overlaying or otherwise appended to display device 155.

Users 112 may also input commands and/or other information to computer system 121 via a network interface device 161. A network interface device, such as network interface device 161 may be utilized for connecting computer system 121 to one or more of a variety of networks, such as computer network 103, and one or more remote computing devices 164, and/or machines 121, connected thereto. Examples of a network interface device include, but are not limited to, a network interface card, a modem, and any combination thereof.

Computer network 103 is a network that may include one or more network elements configured to communicate data (e.g., direct data, deliver data). Examples of a network element include, but are not limited to, a router, a server, a switch, a proxy server, an adapter, an intermediate node, a wired data pathway, a wireless data pathway, and any combinations thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof.

These networks may employ a wired and/or a wireless mode of communication. Various communication protocols (e.g., HTTP, W AP, TCP/IP) and/or encryption protocols (e.g., UDP) may be utilized in connecting and/or for communication over a network, such as computer network 103. In general, any network topology may be used. Information (e.g., data, software 136, etc.) may be communicated to and/or from computer system 121 via network interface device 161. In yet another example, storage device 139 may be connected to bus 130 via network interface device 161. In still another example, input device 180 may be connected to bus 150 via network interface device 161.

Computer network 103 in interactive portal 100 of FIG. 1 may include a server apparatus 167 that is connected to computing machines 115 via a global computer network 170, e.g., the Internet. The term "Internet" generally refers to any collection of distinct networks working together to appear as a single network to users 109. The term refers to the so-called world wide "network of networks" (e.g., the World Wide Web ("WWW"), where each network is connected to each other using the Internet Protocol (IP) and other similar protocols. Internet 170 provides file transfer, remote log in, electronic mail, news and other services. Thus, as used herein, the term "Internet," refers to any computer network.

Server apparatus 167 is connected to Internet 170 through a router 173 and a 176, e.g. switch 176A-B. It is known in the relevant art(s) that routers (e.g., router 173) forward packets between networks. Router 173 forwards information packets between server apparatus 167 and computing devices 121 over Internet 170. A load balancer 179 balances the traffic load across multiple mirrored servers 182, 185, 188, and a firewall 191 provides protection from unauthorized access to server apparatus 167. Switch 176A may act as a gatekeeper to and from Internet 170. Switch 176B allows the components of server apparatus 167 to be interconnected in a LAN or WAN configuration. This permits data to be transferred to and from the various components of server apparatus 167. It is noted that the components that appear in server apparatus 167 refer to an exemplary combination of those components that would need to be assembled to create the infrastructure in order to provide the tools and services contemplated by interactive portal 100, as well as some other embodiments of interactive portal 100 made in accordance with concepts of the present disclosure. It will be readily appreciated by those having ordinary skill in the art that all of the components that are found "inside" of server apparatus 167 may be connected and may communicate via a wide or local area network (respectively, WAN or LAN).

Server apparatus 167 includes an application server 182 or a plurality of application servers 182, as well as databases 194, 197. Examples of applications servers that application server 182 can be include a multi-media server 182A, web application server 182B, a computer server 182C, and a messaging server 182D, among others. Multi-media content server 182A stores the digital content and provides it to other components of server apparatus 167, and to computing machines 112, as desired. This content may be configured separately from web application server 182B so as to increase the scalability of server apparatus 167. In an alternative configuration, web application server 182B and multi-media content server 182A are configured together.

Examples of content formats that can be managed by multi-media content server 182A include, but are not limited to, Graphical Interchange Format ("GIF"), Joint Photographics Experts ("JPEG"), Portable Network Graphics ("PNG"), Tagged Image File ("TIFF"), Audio Video Interleave ("AVI"), Waveform ("WAV"), Audio Interchange File Format ("AIFF"), Au File Format ("AU"), Windows Media Audio ("WMA"), WavePack ("WV"), Free Lossless Audio Code ("FLAC"), Monkey's Audio ("APE"), True Audio ("TTA"), Apple Lossless ("AL"), MPEG-1 Audio Layer 3 ("MP3"), Advanced Audio Coding ("AAC"), Extensible Music Format ("XMF"), 3GP and its derivatives, Advanced Systems Format ("ASF"), DVR-MS, Moving Picture Experts Group ("MPEG") and its derivatives, IFF, Matroska Multimedia Container ("MKV"), MOV, OGG, Ogg Media File ("OGM"), RealMedia, Media Player Classic ("MPC"), RAW, Global System for Mobile Communications ("GSM"), Dialogic ADPCM ("VOX"), DCT, Adaptive Transform Acoustic Coding ("ATAC"), RealAudio ("RA") and its derivatives, DVF, BMP and Bitmap, Portable Pixmap File Format ("PPM"), Prortable Greymap File Format ("PGM"), Portable Bitmap File Format ("PBM"), Portable Anymap ("PNM"), Scalable Vector Graphics ("SVG"), Shockwave Flash ("SWF"), Portable Document Format ("PDF"), encapsulated PostScript, Windows Metafile, and other formats that are used to otherwise electronically store and/or transmit data. Of course, this is not an exhaustive list, but, rather, examples of formats that the multimedia content servers that are used for multi-media server 182A in embodiments of interactive portal 100.

Messaging server 182D is configured to store and distribute electronic communications to and from computing machines 112. Examples of electronic communications include, but are not limited to, electronic mail and electronic messages ("e-mail"), text messages, and chat messages, among others. Although shown as a single server in server apparatus 167, messaging server 182D may include a number of servers that are each configured to exchange one or more of the types of electronic messages mentioned previously. For example, messaging server 182D may include an email server (not shown) that is configured to send and receive the electronic communications, as well as it acts as a repository for electronic communications received from Internet 170. Generally, servers of the type used as messaging server 182D (and the email server, if necessary) include a storage area, a set of user definable rules, a list of users, and a series of communication modules that are consistent with the type of electronic communication.

Web application server 182D and computer server 182C serve as the application layer of the present example of interactive portal 100. More specifically, web application server 182B is a system that sends out Web pages in response to Hypertext Transfer Protocol (HTTP) request from remote browsers (i.e., users 115). That is, web application server 182B provides user interface 102 to users 109 of interactive portal 100 in the form of Web pages.

Computer server 182C may include a central processing unit ("CPU"), a random access memory ("RAM") for temporary storage of information, and a read-only memory ("ROM") for permanent storage of information. Computer server 182C is generally controlled and coordinated by an operating system that is itself a set of machine executable instructions, similar to software 136 discussed above. This operating system controls allocation of system resources and performs tasks such as processing, scheduling, memory management, networking and I/O services, among other things. For example, the operating system resident in system memory and executed by the CPU coordinates the operation of the other elements of server apparatus 167.

Second switch 176B may include inter-process communications protocols 140 A ("IPCP"). These are sets of rules for marshalling and unmarshalling parameters and results. This is the activity that takes place at the point where the control path in the calling and called process enters or leaves the IPCP domain. The IPCP is essentially a set of rules for encoding and decoding information transmitted between multiple processes.

Firewall 191 is configured to shield application servers 182, databases 194, 197, from Internet 170. It is a dedicated gateway machine with special security precaution software that is designed to protect the loosely administered network elements from hidden invasion. Firewalls for use as firewall 191 are generally well-known in the art, therefore, no additional description is necessary.

Databases 194, 197 store software, descriptive data, digital content, system data, and any other data item required by the other components of server apparatus 167. Databases used as databases 194, 197 are provided as, for example, a database management system ("DBMS"), an object-oriented database management system ("ODBMS"), a relational database management system (e.g., DB2, ACCESS, etc.), a file system, and/or another conventional database package. In alternative examples, each of database 194, 197 are implemented using object-oriented technology or via text files that are accessed with a Structured Query Language (SQL) or other tools known to those having ordinary skill in the art.

In view of the foregoing discussion of server apparatus 167, it will be readily appreciated by those having ordinary skill in the art that computer network 103 as described herein will include one or more of the components discussed above. The type, quantity, and selection of such components may depend, however, on the type of architecture that is required to implement the various embodiments of the interactive portal 100. It may further depend on the architecture that is desired. For example, embodiments of interactive portal 100 are configured in accordance with architecture that permits users 109 to view, upload, download, stream, modify, or manipulate content 106, and, in particular, shared content 118. They are also configured to permit users 115 to communicate, to exchange data, and to implement the other features of interactive portal 100 as described herein. Examples of architecture that is suited for use with the features in the embodiments of the interactive portals includes, but is not limited to, client-server architecture, peer-to-peer architecture, and file transfer protocol ("FTP") architecture, among others. Examples of peer-to-peer architectures that might be used include, but are not limited to, pure peer-to-peer networks, friend-to-friend networks, and darknet networks, among others. Whereas such broad concepts of architecture, software and the like currently exist in the art, a detailed explanation of the relevant architecture and such concepts is not needed.

Figure 2:
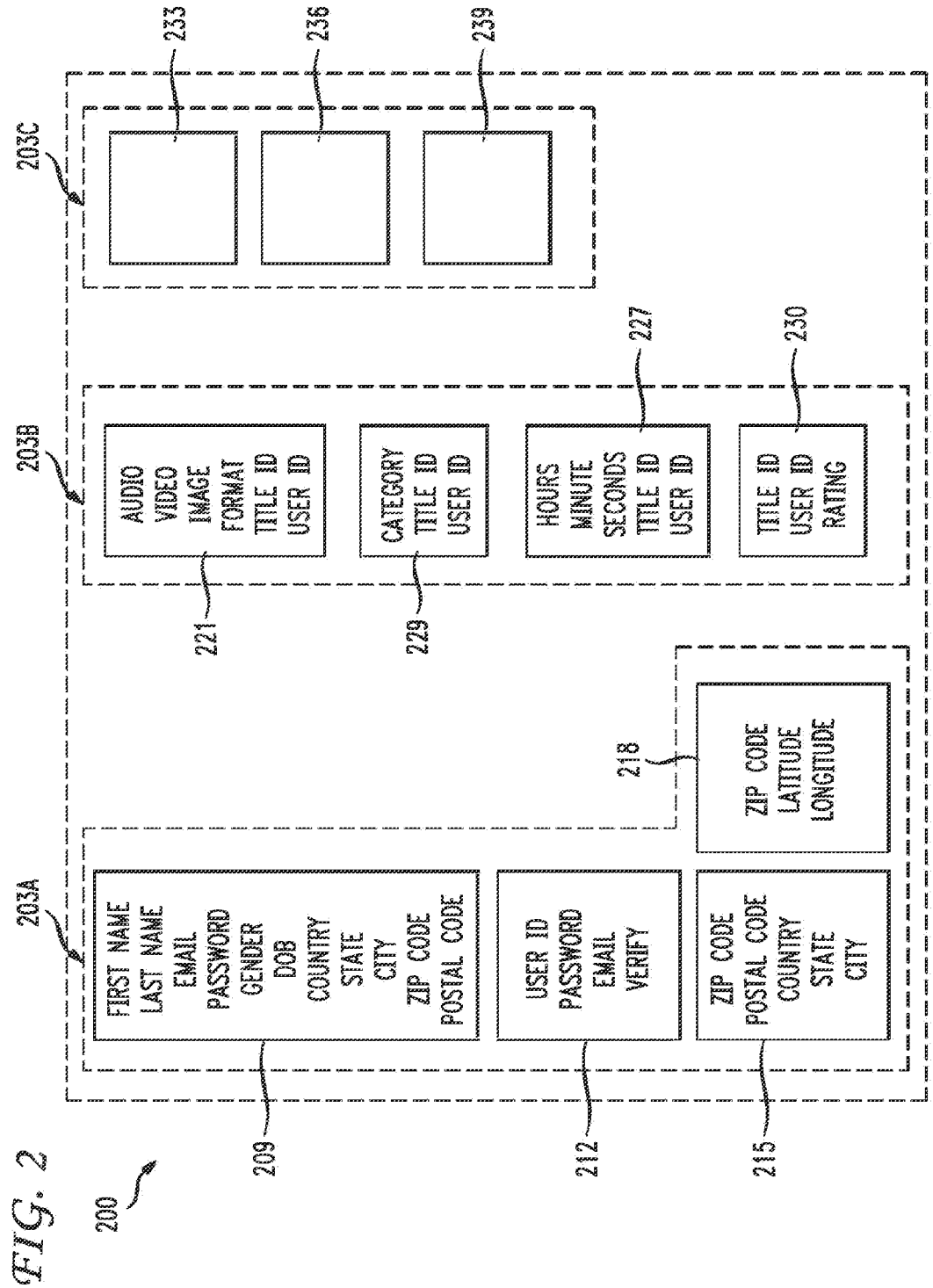
FIG. 2 illustrates a block diagram of a database used in the embodiments of the interactive portal, such as the interactive portal of FIG. 1.

Referring now to FIG. 2, and also FIG. 1, a block diagram of an example of a database 200 that is compatible with one or more embodiments of interactive portal 100 is illustrated. Database 200 includes data categories 203, e.g., 203A-C, that are further organized into data groups 206, e.g., user data 209, profile data 212, location data 215, zip code data 218, format data 221, genra date 224, length data 227, feedback data 230, among others. Databases that are used as database 200 are generally used to manage, organize, and categorize the information that is collected from the users of the interactive portal. These are implemented on, for example, database 194, 197 of FIG. 1, as a DBMS, an ODBMS, a relational database management system (e.g., DB2, ACCESS, etc.) or another conventional database packages.

Although only specific examples of data categories 203 (and data groups 206) are show in the embodiment of database 200 in FIG. 2, it will be appreciated by those having ordinary skill in the art that any number of categories and groups are available for use in database 200. Thus, the illustration of database 200, and the discussion herein, should not limit in anyway the scope and spirit of the present disclosure. Rather, database 200 is described herein as one example of the way the information in the interactive portals is implemented in accordance with concepts of the present invention.

Information found in database 200 is identified in accordance with each individual user. It may be linked together into cohesive units, such as, for example, user accounts, corporate accounts, and other types accounts that the information in database 200 to the users of the interactive portal. In the present example, data groups 206 are configured in a manner that organizes the information into individual user accounts. These include information that is entered by the users via the user interface or other collection method, e.g., via telephone.

Data groups 206 include several categories of information, including, but not limited to, descriptive data, shared content data, rating data, as well as other data items. Generally, descriptive data refers to information that describes the user or characteristics of the user. It may also include elements that describe attributes of the user, such as, for example, gender, marital status, occupation, and the like. The descriptive data can be further grouped into user data 209, profile data 212, location data 215, and zip code data 218, each of which include any number of data elements.

Content data refers to data that describes the content that is shared by users of the interactive portal. It may also include data elements that describe attributes of the content, such as, for example, format, category, length, rating data, and the like. The content data can be further grouped into format data 221, genre data 229, length data 227, feedback data 230, each of which include any number of data elements.

Other data items relate to operating components of the exemplary system. Such other data items include favorite content 233, messages 236, bulletin board 239, as well as preference data. Preference data refers to data that describes the preferences that the users of the interactive portal have with respect to one another, and with respect to their individual account settings. The data fields that are used to capture descriptive data can also be used to capture preference data, as well. In one example, in the descriptive context someone might "have a specific zip code;" while in the preference context that person might "prefer to meet people in that zip code." Most preference data in this example when presented in the user interface (e.g., GUI) is presented in hypertext markup language ("HTML"). So, embodiments of the interactive portal can include search functions that permit user to type any search terms they desire into a search box so as to search the descriptive data and get the results.

Figure 3:
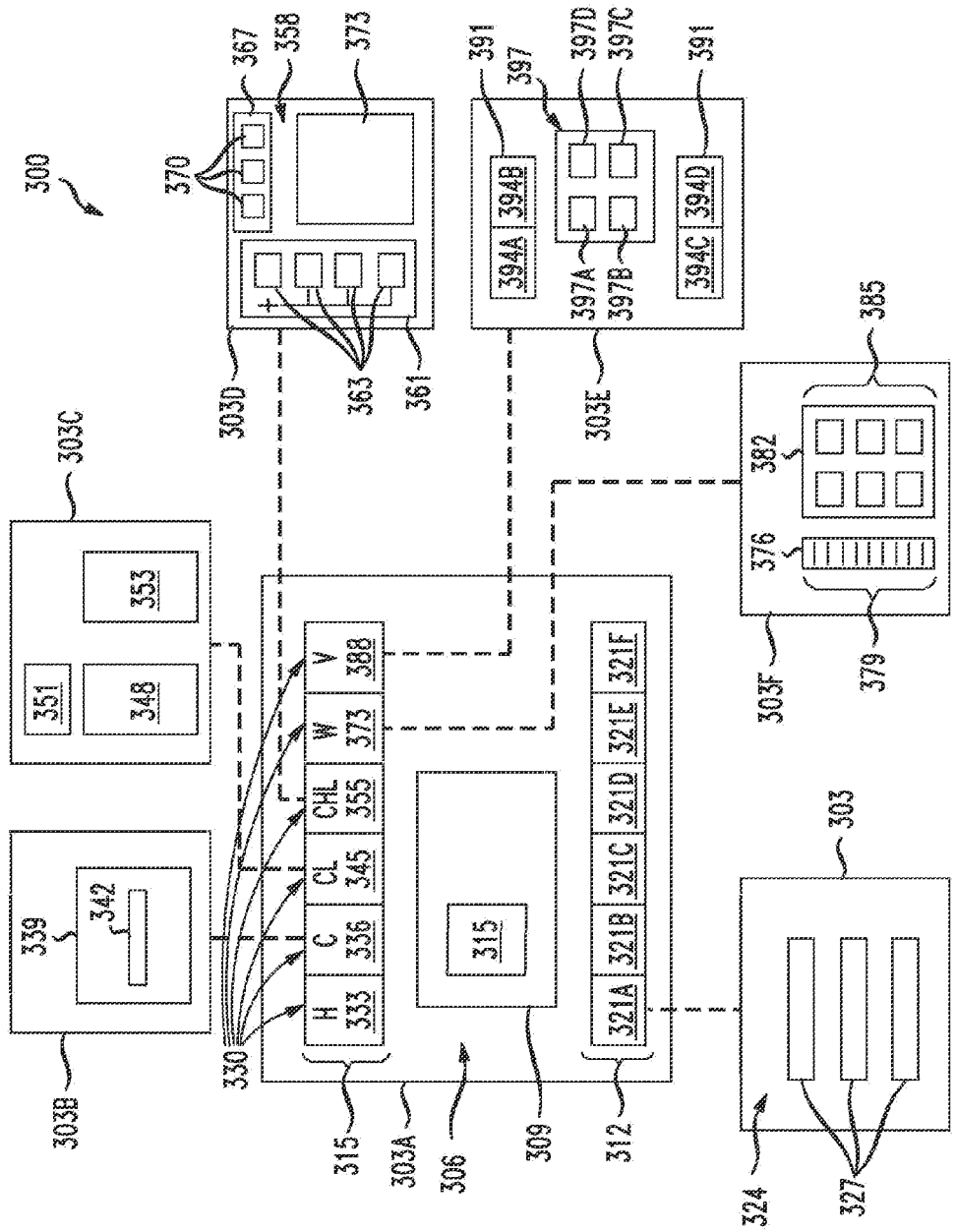
FIG. 3 illustrates an example of a user interface that is presented to the user of the interactive portal.

Referring now to FIG. 3, a schematic diagram of an example of a user interface 300 that allows users to access the features of the interactive portal and is designed to allow a user to navigate the content of embodiments of the interactive portal, such as interactive portal 100 of FIG. 1, is illustrated. It may include, for example, a screen 303, e.g., screens 303A-F, that includes an interactive area 306 that has a multi-media area 309, a challenge area 312, and a navigation area 315 that are each configured to present to the user information, data, and other content that is found on the interactive portal.

Generally, multi-media area 309 of user interface 300 has a multi-media player 315 that is configured to display, play, and otherwise present the shared content in a manner that is visually and audibly accessible to the user. In accordance with embodiments of the present invention, the multi-media player 315 may be an embedded player, such that it may be embedded on any accessible webpage or interactive portal. For example, the multi-media player 315 may be embedded on an individual's personal home webpage not associated with the interactive network described herein. When embedded on such individual's home webpage, any features and embodiments disclosed herein would be available via the multimedia player 315, whereby the multi-media player acts 315 as an embedded portal to the interactive network described herein.

Challenge area 312 includes category links 321, e.g., category links 321 A-F, that are each associated with a content list 324 that includes shared content 327 that is stored on the interactive portal. Navigation area 315 has a number of navigation links 330 that permit the user to navigate to other ones of screen 303 of user interface 300 with an input device, e.g., by "pointing and clicking on the appropriate link."

In the present example, navigation links 330 include, 1) a home link 333; 2) a challenges link 336 that displays a search feature 339 that uses a search criteria 342 to retrieve user information that is stored on the interactive portal; 3) a challenger link 345 that provides a challenger information region 348, a challenger picture region 351, and a content upload region 353, that are used to establish the user accounts, or "challenger accounts", for the users of the interactive portal; 4) and a challenger home link 355 that displays a features region 358 that is accessible to those users of the interactive portal with a challenger account. Features region 358 includes a file structure region 361 that displays file folders 364 that correspond to one or more features of the challenger account in a hierarchical order, an icon region 367 that displays selectable icons 370 that correspond to one or more of the features of the challenger account, and a display region 373 that acts as the display for these features in response to either the file folders 361 and/or selectable icons 370.

Navigation links 330 also include 5) a winners club link 373 that displays a category region 376 with categories 379 and a winners region 382 with winning content 385 that is selected from among the shared content in particular ones of categories 379 in accordance with a competitive format (not shown), as well as 6) a video off link 388 that displays regional competition region 391 with regions 394A-D, and overall competition area 397 that includes regional content 397, e.g. 397 A-D from each of regions 394A-D. Details of the features of screens 303 of user interface 300, will be discussed below, and in connection with the exemplary screens illustrated in the screen shots of FIGS. 5-12 below.

While navigation area 315 is shown having a particular arrangement of navigation links 330, those skilled in the art will readily appreciate that other arrangements may be used to suit a particular user interface design. For example, the types of links that are suited for use in embodiments of user interface 300 may include, but are not limited to, a link that permits the user to search for content on the interactive portal or on the WWW; a link that permits the user to purchase merchandise, e.g., clothing, digital video disks (DVD); a link that provides information and/or permits the user to communicate criticism, suggestions, questions, and general commentary about their experience on the interactive portal; a link that permits the user to explore business endeavors, e.g., advertisements, on the interactive portal; a link the provides the user with information about the rules, analysis and organization of the shared content, as well as many other links that are not detailed herein but that fall within the scope and spirit of the present invention.

With continued reference to FIG. 3, screens that are used as screen 303 of user interface 300 are linked together so that the user can navigate from one screen to another. This enables users to move amongst the various screens using any suitable input device, e.g., a mouse, touch screen, etc. This can be achieved in a manner similar to the way Web sites are navigated on the World Wide Web (WWW). In one example, user interface 300 employs one or more uniform resource identifiers (URI), and the protocols, software, and rules that are associated with systems that use URI-type identifiers, to link the screens of user interface 300.

Players that are used as multi-media player 318 are generally adaptable to audio, video, and image content. It may be desirable, for example, that players that are selected for player 318 are suited to handle each type of content, as well as the range of formats that is available for each type of content. For example, players that are suited for player 318 are adapted for a variety of video formats, including, but are not limited to AIFF, WAV, XMF, 3gp, ASF, AVI, DVR-MS, MPEG, IFF, MKV, MPEG-TS, MP4, MOV, OGG, OGM, RealMedia, as well as similar format that are used to electronically capture, store, and/or transmit video files. The players are also compatible with audio content formats that include, but are not limited to, MP3, WMA, WA V, OGG, MPC, FLAG, AIFF, RAW, AU, GSM, VOX, DCT, ACC, M4A, MP4, ATRAC, RA, RAM, DSS, MSV, DVF, as well as similar format that are used to electronically capture, store, and/or transmit audio files. Players for player 318 are also compatible with image formats including, but not limited to, JPEG, TIFF, RAW, PNG, GIF, BMP, PPM, PGM, PBM, PNM, SVG, SWF, PDF, encapsulated PostScript, Windows Metafile, and any other format that is used to electronically capture, store, and/or transmit image files. Although it may be desirable that the player selected for player 318 is compatible with every type and format of the multi-media content, alternative embodiments of user interface 300 may include more than one player that are selected, respectively, because they are adaptable to one or more of the types of content.

Typical category links that are used for category links 321 A-F are based on the characteristics of the content found in content list 324. This content as it relates to shared content 327. Exemplary characteristics include subject matter (or "genre"), length, and language, among others. But, this is not an exhaustive list. Rather other characteristics can be selected and assigned to shared content 327, as desired. For purposes of the embodiment of user interface 300 of FIG. 3, shared content 345 is organized in accordance with its genre. Examples of the genre that can be used in embodiments of the interactive portal include, but are not limited to, "short films," "comedy," "pesky pets," "garage bands," "family video," and "agony of defeat." It is contemplated, however, that the genre is amenable to other descriptive indicators of the subject matter. Such indicators may be selected by the interactive portal, i.e., by the administrators or designers of the interactive portals. Or, the users of the portal may create their own genre, as desired.

Content list 324 may be instantiated in a number of ways. One exemplary content list for content list 324 is a list of shared content 327. Another is displayed as one or more images taken that are part of, or taken from, shared content 327 (e.g., "thumbnails"). Each of these can be readily implemented by those having ordinary skill in the art. In one example, shared content 327 that is uploaded to the interactive portal is assigned a genre. This may occur automatically, or, alternatively, it may require that the user input or select the proper information that corresponds to the genre of their uploaded content.

Once the genre is assigned to the shared content, it may be found in content list 324 under category link 321 that corresponds to that genre. Thus, a music video that features a rock band would be assigned to the genre "garage bands." When a user selects a particular one of category links 321 in challenge area 312, e.g., by "pointing and clicking on it," user interface 300 may display on screen 303 the content list with shared content that is assigned to that genre, if any, associated with that category link. Then, the user can select from the resultant list a particular one of the shared content for viewing.

It would be customary, though not imperative, that the screen associated with home link 333 in navigation links 330 is the primary screen, i.e., the "home page," of embodiments of the interactive portal. As discussed in connection with FIG. 5 below, home link 333 is typically associated with the first Web page presented to a user of the interactive portal. In accordance with embodiments of the present invention, the home link 333 is the portion of the interactive portal that provides the user with general content, advertisements, links, and other information that has to do with the interactive portal.

Users that want to search for other users on the interactive portal may enter search criteria 342, via an input device (e.g., a keyboard), into search feature 339. Search criteria that search criteria 342 of challenges link 336 can be include, but are not limited to, name, age, e-mail address, account id, country, state, zip code, age, and gender, among others. Use of the search criteria in search feature 339 to retrieve information will be generally understood by those having ordinary skill in the art. Search feature may utilize, for example, algorithms that are configured interact with the portions of the interactive portal e.g. databases 194, 197 (FIG. 1), where the relevant information is stored to retrieve that information that corresponds to the particular search criteria.

Challenger information region 348, a challenger picture region 351, and content upload region 353 that are used to set up the challenger accounts is each configured to receive data, e.g., from an input device. This data includes, but is not limited to, text, images, video, and audio, among others. In one embodiment of the interactive portal 194 and 197, the information is stored on the interactive portal, i.e., in databases discussed in connection with FIG. 1 above.

As illustrated in FIG. 3, challenger information region 348 may be configured for information about the user, e.g., e-mail address, passwords, address (e.g., country, state, zip code), gender, birth data, first name, last name, school, work, other general data and commentary about the user, and the like. Challenger picture region 351 and content upload region 353 are configured to permit the user to upload, save, and/or store their shared content (e.g., images, video, and audio) in one or more of the formats discussed above.

File folders 364 and selectable icons 370 of features region 358 typically correspond to applications that are available to users that have challenger accounts. For example, some of the file folders and/or selectable icons found in the features region typically correspond to applications that permit the user to communicate (and manage communications) with other users of the interactive portals that have challenger accounts. This may be done via email, instant message, text message, and similar types of electronic messaging applications. The file folders and/or selectable icons may also correspond to applications that have planning and other functionality, like calendars, datebooks, journals, and other similar type of applications that are suited to maintain chronological order of important events, dates, and other information in daily, weekly, and/or annual order, as desired. Still other options that may be available in the feature region may include applications that permit the user to modify certain aspects of their challenger account. These aspects may include, for example, personal information, server and folder information, login information, message composition, message viewing, message location, message filters, as well as other display options and applications. Suitable applications that are used in the features region include, but are not limited to, e-mail, address book, notes, calendar, and account management applications. It is contemplated that a user can select from among the file folders 364 and/or selectable icons 370 with an input device, e.g., by "pointing and clicking on it." When the user selects one of these features, it causes display region 373 to display menu choices, options, and other selections that the user can navigate to further implement the chosen application, e.g., by "pointing and clicking on them." An example of some of these options will be discussed in FIGS. 7-8 below.

A feature of some embodiments of the interactive portals discussed herein is the way the portal organizes particular ones of the shared content. In the present example, winning content 385 that is found in winners region 382 is identified using a number of competitive analysis methods. Generally, the analysis methods that are used by the interactive portal include algorithms, software, and other automatedly-implemented methods. These are configured to identify particular ones of the shared content from among other ones of the shared content based on feedback provided by the users of the interactive portal. In many embodiments, the shared content is from the same genre. Feedback that is suited for use in the analysis methods can take many different forms. Examples include, but are not limited to, points, scores, commentary, votes, ratings, letter grades, total number of views, and any combination thereof. In one exemplary embodiment of the present invention, a plurality of multi-media content is eligible for a particular level of competitive analysis. In such an example, users of the interactive portal may choose which of plurality of multi-media content is most enjoyable and/or deserving of winning a competition. When a user chooses which multi-media content should win, the user designates a "point" to that multi-media content.

Where the user rating system is based on "points," as exemplified above, then the analysis method to identify the winning content from among two or more shared content of the same genre determines which of the shared content received the highest cumulative point total for a predetermined period time. Exemplary time periods include, daily, weekly, monthly, annually, bi-monthly, bi-annually, or the like. An example of a method for identifying shared content is discussed in more detail in connection with FIG. 4 below.

Regional content 397 A-D in overall competition area 397 that is displayed via video off link 388 is also selected in accordance with the competitive formats discussed above, and in more detail below. To provide one or more of the regional content, however, the analysis method may compare shared content from different genre. For example, the regional content that is found in overall competition area 397 can be selected by comparing the cumulative point totals of the winning content for each genre over a given period of time. Then, an overall winner (not shown) is selected from among the regional content that is found in overall competition area 397. Thus, it is possible that the overall winner is selected from among regional content that are all from different genre.

Figure 4:
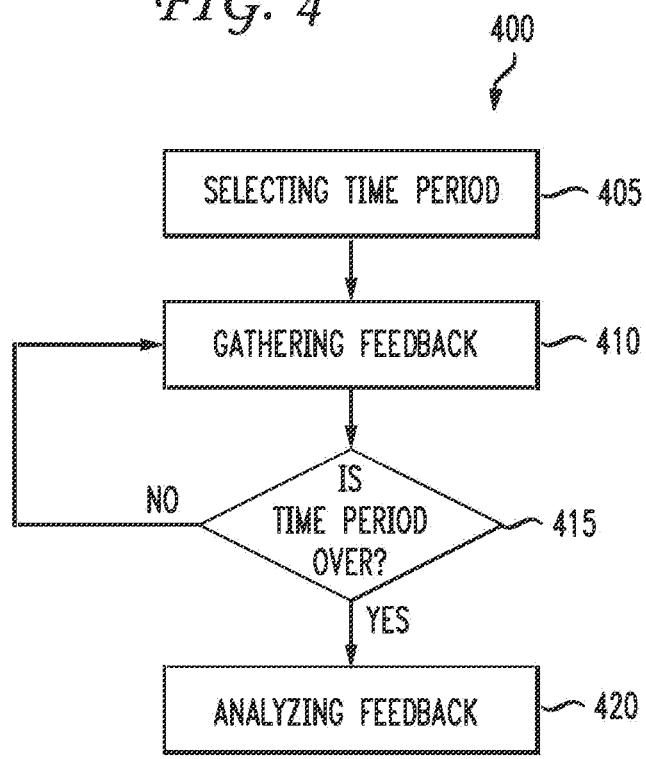
FIG. 4 illustrates a flow chart that describes a method for organizing the shared content in accordance with feedback provided by the users of the interactive portal.

FIG. 4 illustrates an example of a method 400 that is used to organize the shared content of the interactive portal in accordance with concepts of the present invention. Method 400 includes, at step 405, selecting a time period for gathering data. Then, at step 410, method 400 includes gathering feedback from the users on the shared content. This includes, for example, gathering points, votes, and other indicators that users select via the user interface after they view particular ones of the shared content. Next, at step 415, method 400 includes determining whether the time period has been met. If it is, then the method moves to step 420, where method 400 includes analyzing the feedback to identify which of the shared content received the highest cumulative point total.

The steps of method 400 can be applied, in whole, or, in part, to analyze the feedback that users provide for particular ones of the shared content. In a one embodiment of the interactive portal, examples of method 400 are applied in a manner that identifies the winning content that is found in the winners region, as discussed above. It can also be used to determine the overall winner from among the regional winners, as well as, for the purpose of identifying a particular one of the shared content from other shared content that is found on the interactive portal. In accordance with embodiments of the present invention, any competitive format is contemplated within embodiments of the present invention. For example, head-to-head, bracket, open popularity forum, and the like, are suitable competitive formats for embodiments of the present invention.

It is noted that the processing and decision block that are illustrated in FIG. 4 represent steps performed by functionally equivalent circuits such as a digital signal processor circuit or an application specific integrated circuit (ASIC). The flow diagram does not depict the syntax of any particular programming language. Rather, the flow diagram illustrates the functional information one having ordinary skill in the art requires to fabricate circuits or to generate computer software to perform the processing required of the particular machine. It should also be note that many routine program elements, such as initialization of loops and variables and the use of temporary variables are not shown. The particular sequence of steps described is illustrative only and can be varied without departing from the scope, spirit, and concepts of the present disclosure.

Generally speaking, the time period that is selected identifies the period during which the interactive portal will consider the feedback that the users of the interactive portal provide in connection with the shared content. It may be based on a time increment, e.g., minutes, hours, days, etc. While the actual value of the time increment can be selected at random, it may be desirable that the time increment is selected based on the desired length of a contest, or other event, that is used to grant rewards to the users that uploaded the winning content or the overall winner.

The algorithms used to gather the feedback from the users will be generally recognized in the art. They may respond to actions from the users. In one example, the algorithm may register the numerical value or the other indicator that is assigned to the users' selection, e.g., "by pointing and clicking on a menu item."

Similarly the instructions that are used to analyze the feedback may operate on the registered values in order to organize, and/or to identify, particular ones of the shared content and their corresponding user. Such instructions will often operate in a manner that access the various user information that may be saved in the databases of the computer network.

Referring to FIGS. 5-12, these figures are used hereinbelow to illustrate various features of the user interface that are available on some exemplary embodiments of the interactive portal. Generally, the screens illustrated by the screen shots of FIGS. 5-12 are examples only, and, for purposes of the descriptions that follow below, illustrate examples of user interface 500, 600, 700, of the interactive portal in accordance with embodiments of the present invention. Such interactive portals may run on any suitable machine, e.g., a computing device (such as computer system 121 of FIG. 1.) As discussed in more detail below, user interface 500, 600, 700, include interactive features that greatly simplify the actions the user must take in navigating the content of the interactive portal.

Figure 5:
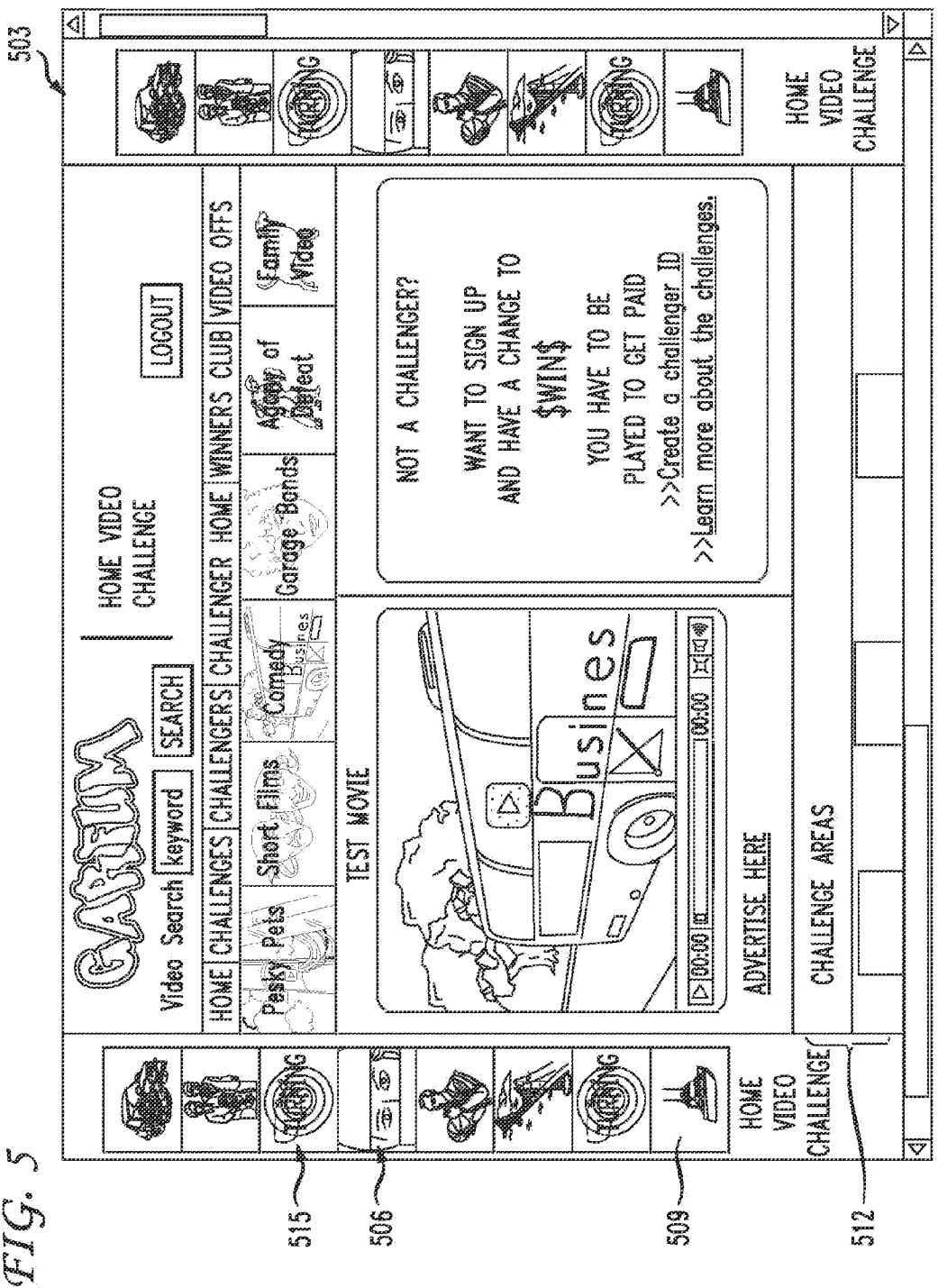
FIG. 5 is a screenshot of the graphical user interface (GUI) of FIG. 3 illustrating an example of the home link of the interactive portal.

With continued reference to FIG. 5, the screen shot of user interface 500 includes a screen 503 that has an interactive area 506 that is configured to display a multi-media area 509, a challenge area 512, and/or a navigation area 515. While interactive area 506, and user interface 500 in general, is shown having particular arrangement of areas 509, 512, and 515, those skilled in the art will readily appreciate that other arrangements may be used to suit a particular user interface design. Using the layout of interactive area 506 shown, when the user wishes to view other screens of the interactive portal, they may select one or more of the links that are found in interactive area 410 so as to be transported (electronically) to one or more different screens, such as the screens discussed in FIGS. 6-12 below.

Assuming, for this illustration only, that interactive area 506 of user interface 500 of FIG. 5 is the home page and displays only content of the interactive portal that is of a general nature, then the user can select from amongst the links that are found in areas 509, 512, and 515, to explore other areas of the interactive portal. The user, for example, may select one of the links from challenge area 512 and from navigation area, e.g., "by pointing and clicking on it."

Figure 6:
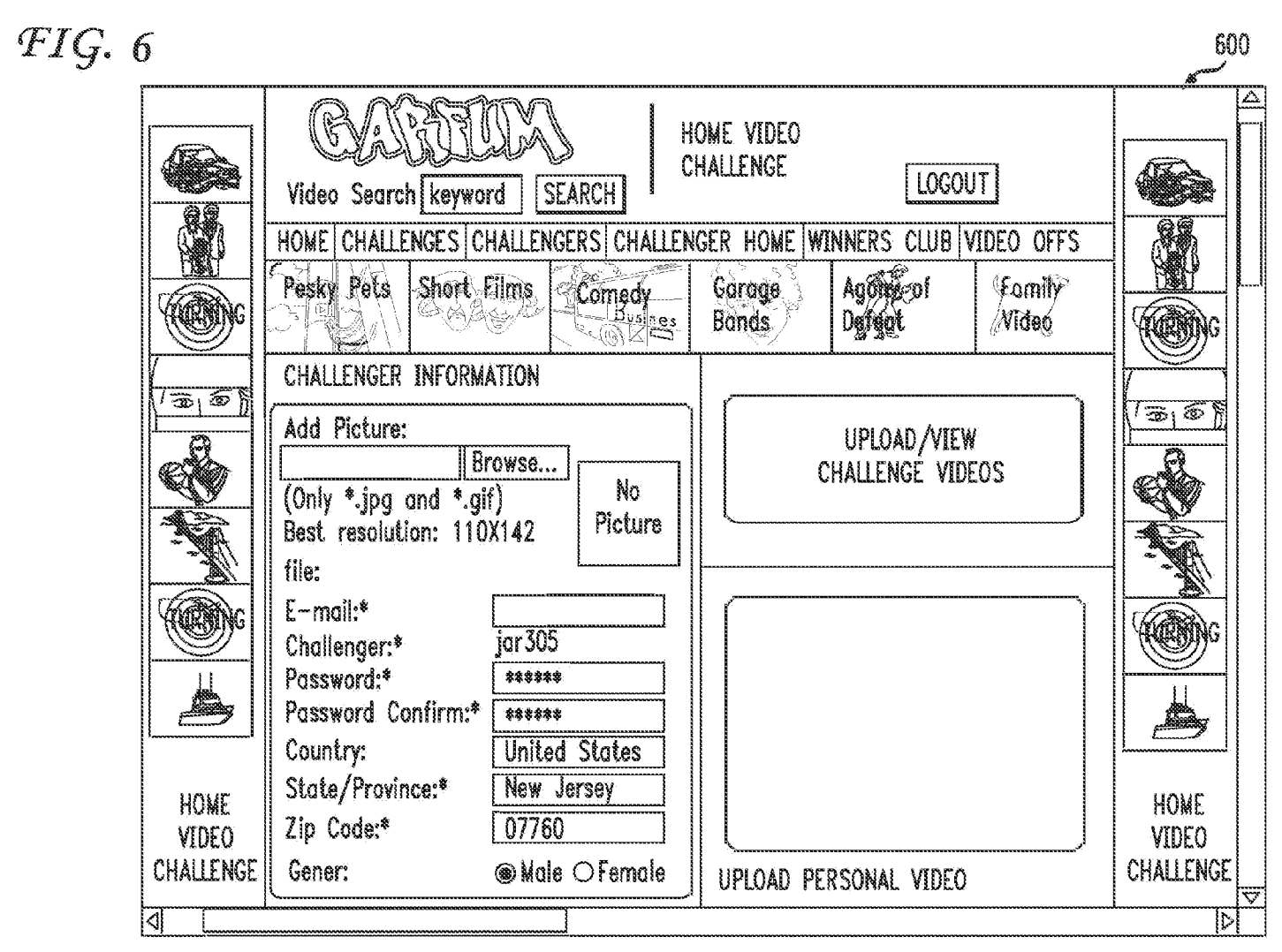

FIG. 6 illustrates a screen shot of an example of user interface 600 that permits users to enter data, e.g., personal data, content data, etc. User interface 600 may be associated with the challenger link, discussed above. It may be desirable that this information is stored on one of the databases use on the computer network. In the present example, user interface 600 can enter descriptive data (e.g., e-mail address, country, state, zip code, gender, etc.) in the challenge information region and to upload shared content to the interactive portal in the content upload region. Some screens that are used for user interface 600 may also include a video search feature, as well as a multi-media player that is used to view shared content on the interactive portal.

Figure 7:
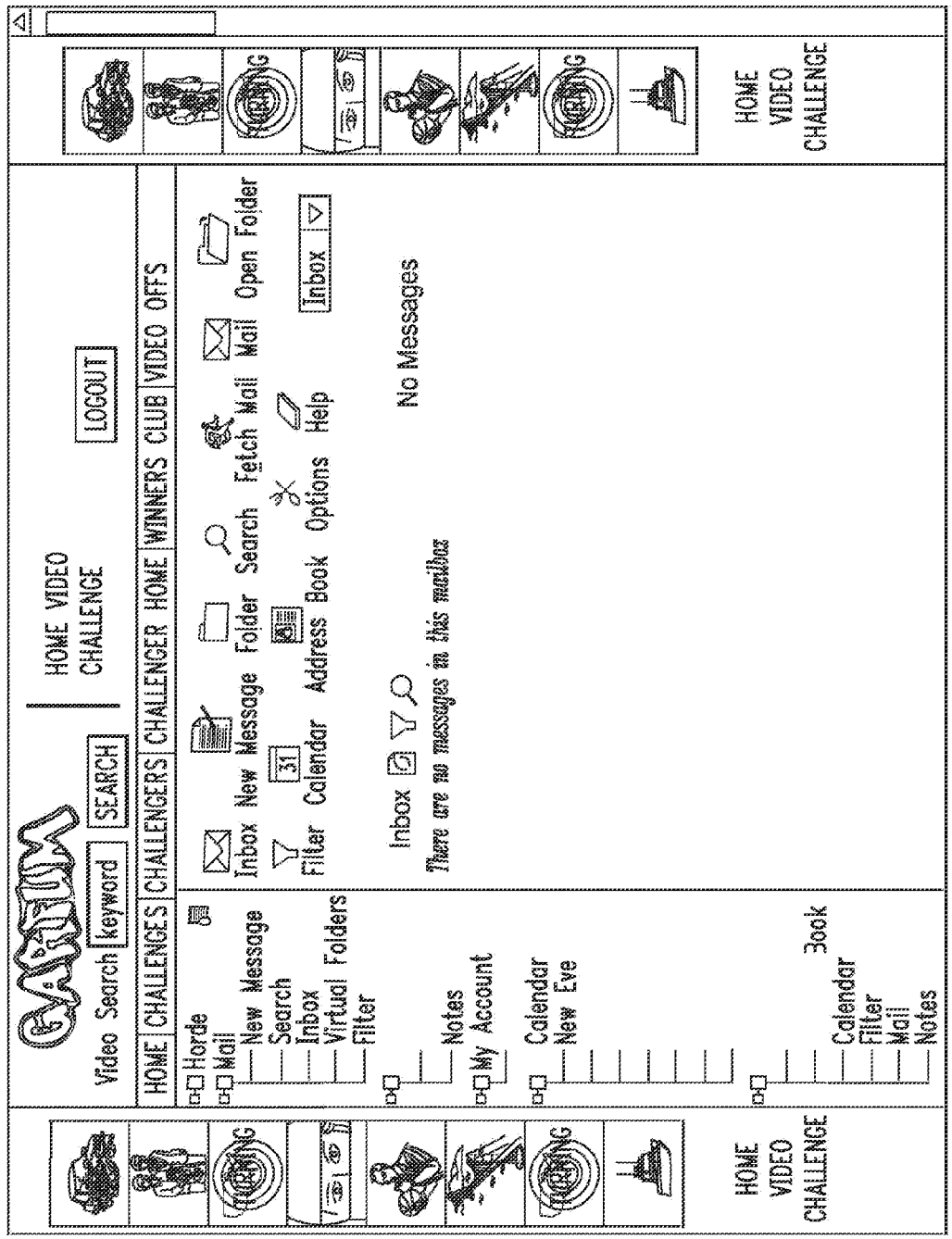
FIG. 7 is a screenshot of the GUI of FIG. 3 illustrating an example of the challenger home link of the interactive portal.
Figure 8:
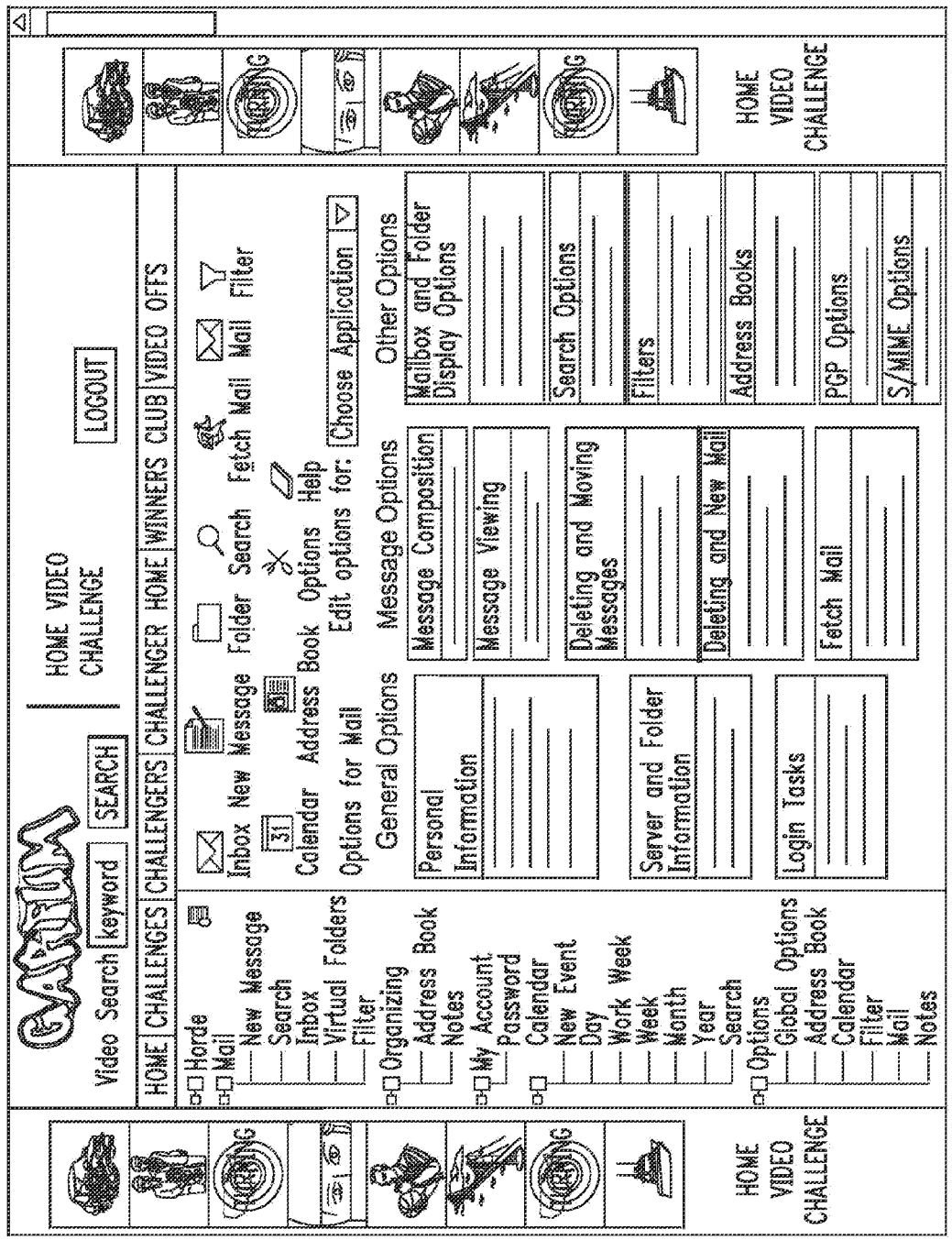
FIG. 8 is a screenshot of the GUI of FIG. 3 further illustrating another example of the challenger home link of the interactive portal.

FIGS. 7-8 illustrate screen shots of an example of user interface 700, 800 that allows the user to view and manage the various applications that may be available via their challenger account. The screens of user interface 700, 800 may be linked to the challenger home link, discussed above, as well as to each other. When the user wishes to activate one of the applications, they can select a file folder from the file folder region or, alternatively, from amongst the selectable icons in the icon region, e.g., by "pointing and clicking on it." Then, the features of the application that correspond to the file folder and/or selectable icon will be displayed in the display region. In the example of user interface 700 that is illustrated in FIG. 7, the features of the "inbox" application are seen. Similarly, in the example of user interface 800 that is illustrated in FIG. 8, the features of the "options" for the email application are seen.

Figure 9:
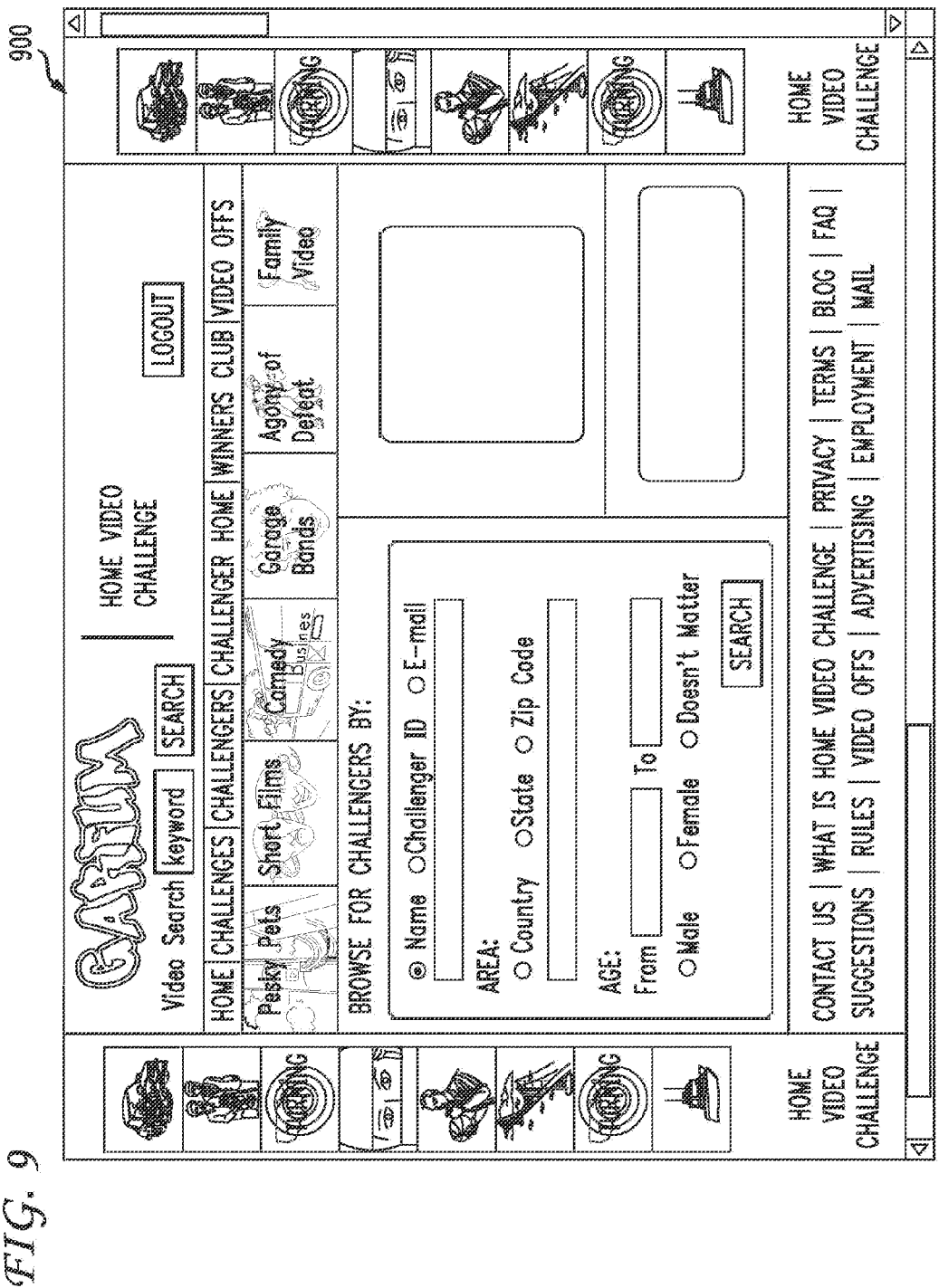
FIG. 9 is a screenshot of the GUI of FIG. 3 illustrating an example of the search function of the interactive portal.

FIG. 9 illustrates a screen shot of an example of user interface 900 that permits the user to search for other users, shared content, and other information. This screen often corresponds to the challenger link, described above. In the screen shown in FIG. 9, the user can enter one or more search criteria, e.g., name, challenger and/or user id, country, state, zip code, age, gender, e-mail address, and other criteria that is associated with the information and data stored by the interactive portal. The user can then activate the search by selecting the "search" icon, e.g., by "pointing and clicking on it."

Figure 10:
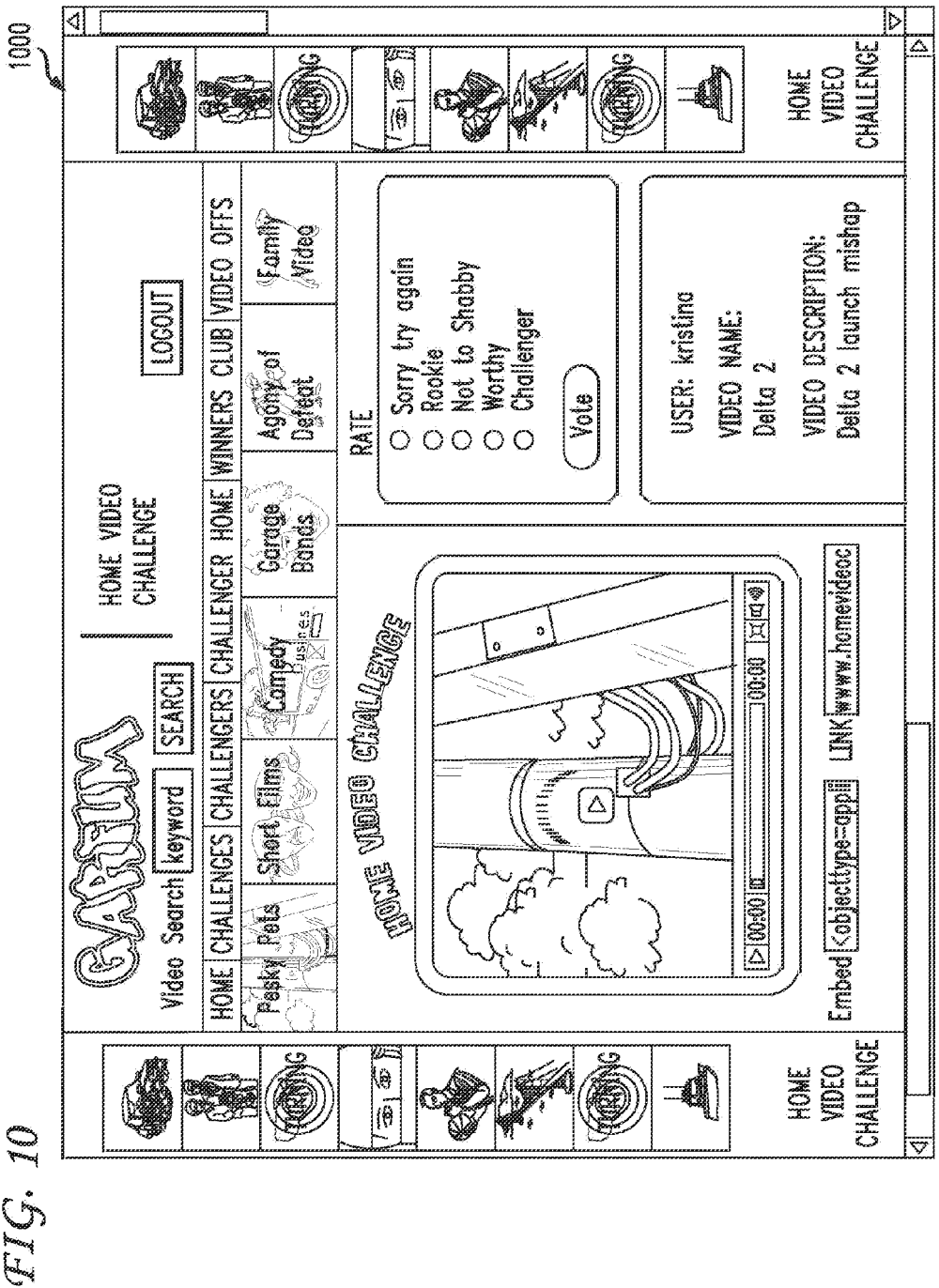
FIG. 10 is a screenshot of the GUI of FIG. 3 for gathering feedback from the user on the shared content for use in the method for organizing the shared content based on this feedback, such as the method of FIG. 4.

FIG. 10 illustrates a screen shot of an example of user interface 1000 that permits the user to view (or hear) particular ones of the shared content. It also allows the users to provide feedback on the shared content. In the present example, the user can add comments, thoughts, and messages about the shared content. Some embodiments of the interactive portal may transmit this commentary to the user associated with the shared content via email, text message, or in a manner that is consistent with the concepts discussed herein. The user can also provide feedback by selecting the rating they feel is appropriate. In the present illustration of user interface 1000, the ratings that can be applied to the shared content include, from the lowest value to the highest value, "sorry try again," "rookie," "not too shabby," "worthy," and "challenger." It is noted that although the ratings that are seen on the screen of FIG. 10 are textual, they can be used in the competitive analysis methods that are contemplated by the disclosure herein. For instance, each of the ratings that are found in user interface 1000 may be assigned numerical values that are then utilized by the analysis methods. Alternatively, it is further contemplated that ones of the competitive methods may be constructed (e.g., via machine-executable instructions, software) so as to be able to utilize the textual message.

Figure 11:
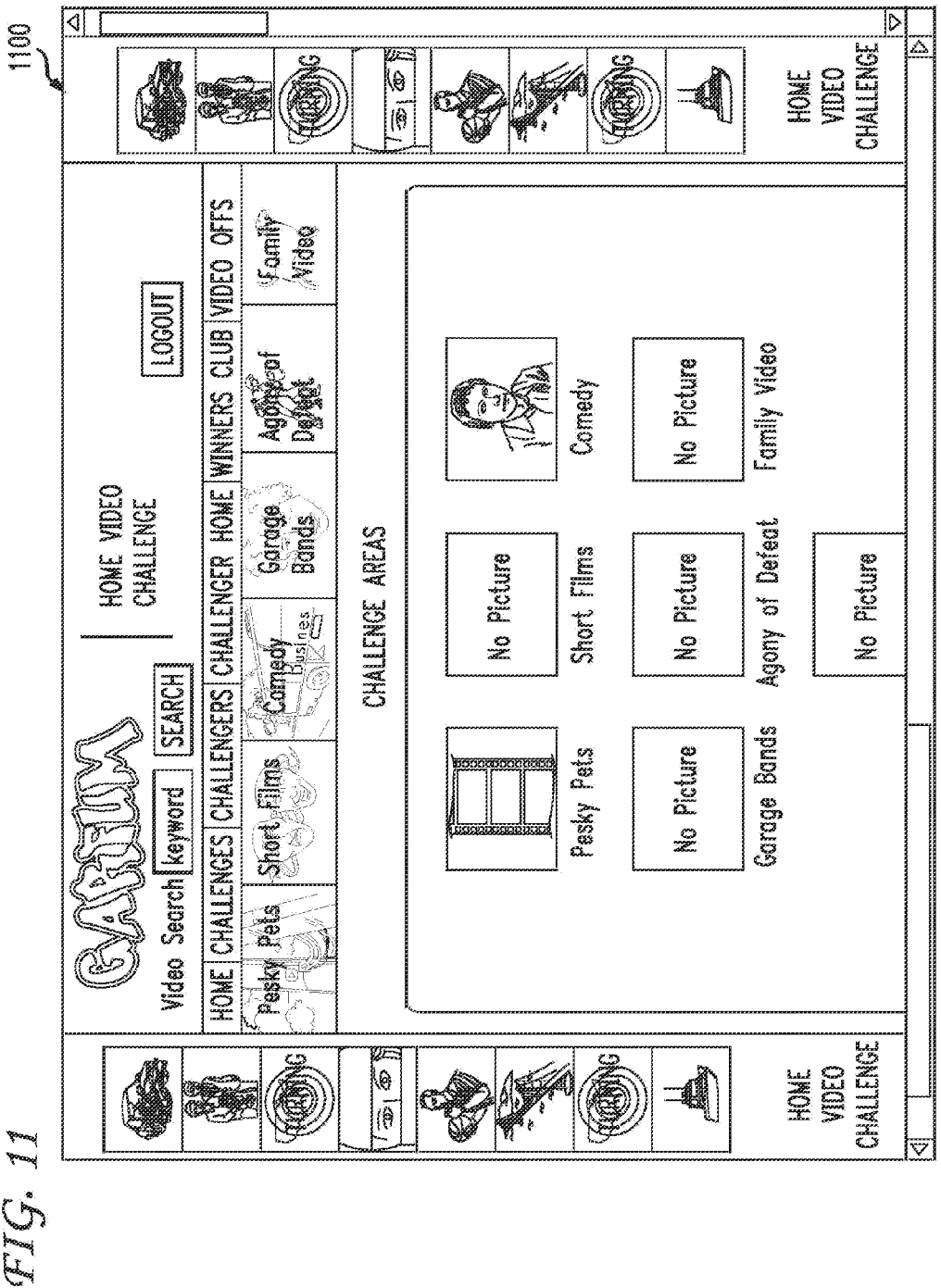
FIG. 11 is a screenshot of the GUI of FIG. 3 illustrating an example of the category link of the interactive portal.

FIG. 11 illustrates a screen shot of an example of user interface 1100 that provides the user with a list of the categories (e.g., genre) of the shared content that is available on the interactive portal. This screen typically corresponds to the challenges link, discussed above. Further, in certain implementations of the interactive portals described herein, these categories will correspond to the subject matter of the shared content, as described above. As can be seen in FIG. 11, the list may include images, or "thumbnails," that relate to particular ones of the shared content that is associated with that category. Or, in alternative embodiments of the interactive portal, the list may simply show a list of the categories that have shared content available for the user. Of course, the actual appearance of the categories is flexible, in that, the screen that is used for user interface 1100 can present the categories in a manner that is suitable for the user to select from among the available categories of the shared content.

Figure 12:
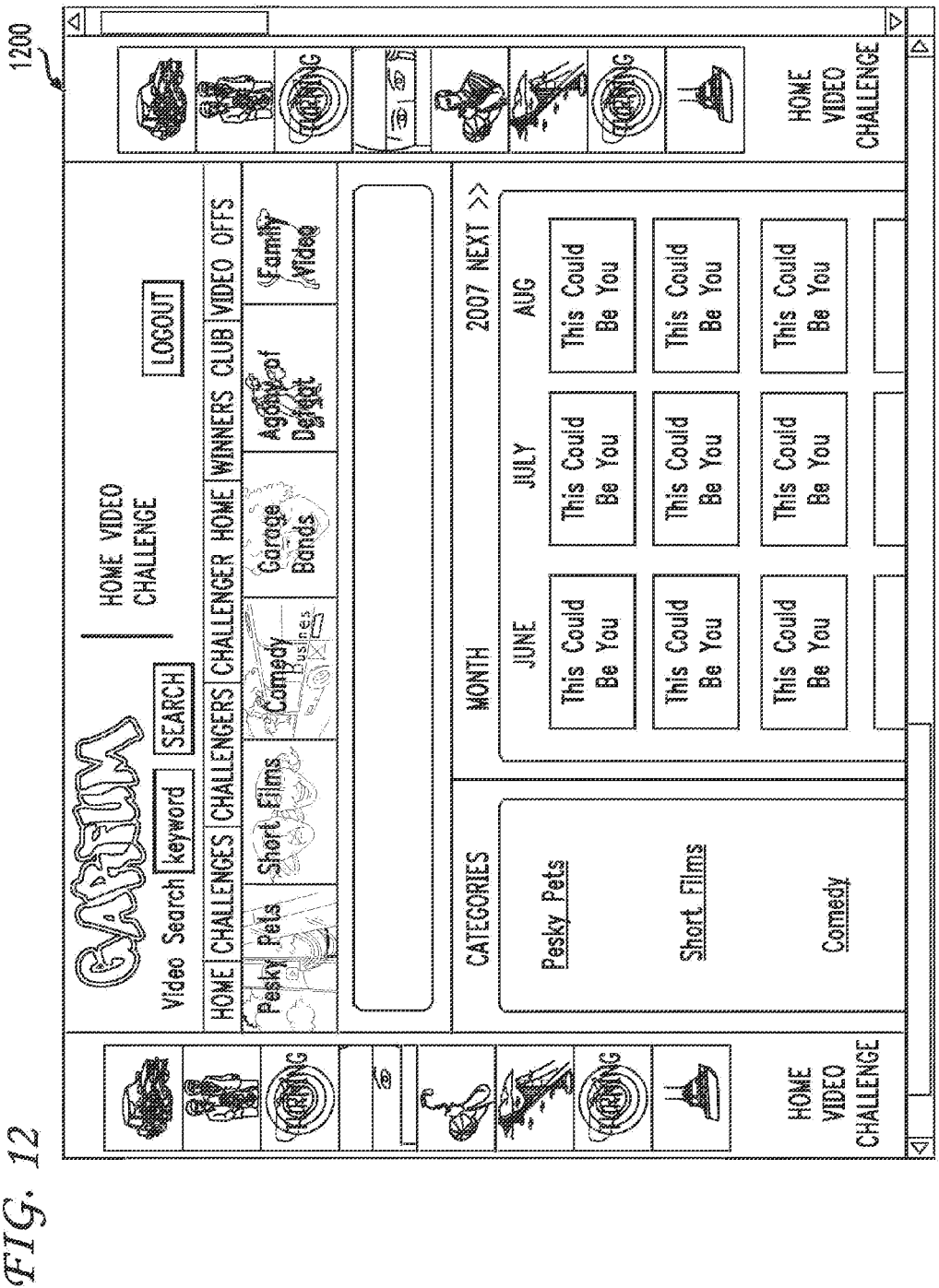
FIG. 12 is a screenshot of the GUI of FIG. 3 illustrating an example of the winners club link of the interactive portal.
Figure 13:
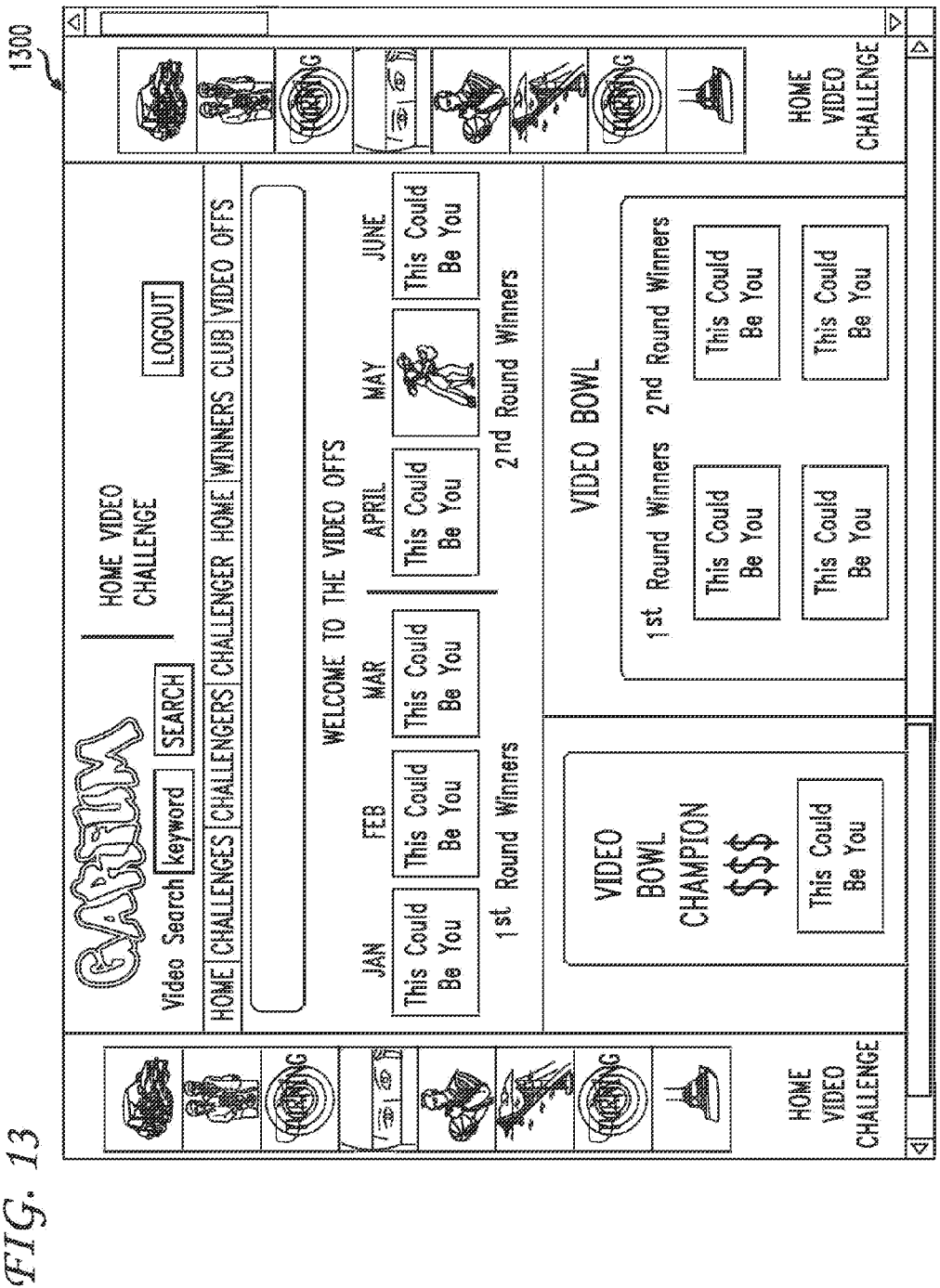
FIG. 13 is a screenshot of the GUI of FIG. 3 illustrating an example of the video off link of the interactive portal.

FIG. 12 illustrates a screenshot of an example of user interface 1200 that displays particular ones of the shared content that is selected in accordance with the competitive analysis methods that are discussed above. This screen is often associated with the winners club link, described in detail above. In the present example, the winning content that is found in the winners region are organized so as to display monthly winners that correspond to the various categories of the shared content. Similarly, FIG. 13 illustrates a screenshot of an example of user interface 1300 that displays particular ones of the shared content that are also selected in accordance with the competitive analysis methods that are discussed above. In this example of user interface 1300, it is seen that the overall winners region is organized to display the regional content, as desired.

In view of the foregoing discussion of the winners region and the overall winners region, it is noted that various embodiments of the interactive portal may use a variety of schemes, monikers, and other identifies to elaborate on the contest that may be administered via the interactive portal. For example, winning content that is identified over a given time period can also be paired against each other to identify which of the regional content has received the most favorable feedback (e.g., the highest cumulative point total). Consider, for instance, a first video in category A received 100 points in a given monthly time period, and a second video in category B received 150 points during the same monthly time period. In context of the winning content that is displayed via, e.g., the winners club link, the first video and the second video may both appear as winning content in the winners region. However, for purposes of the regional content that is displayed via, e.g., the video off link, the second video will be identified when compared to the first video.

While the foregoing is directed to embodiments of the present invention, other and further embodiments of the invention may be devised without departing from the basic scope thereof.

What is claimed is:

1. A method for sharing multi-media content among a plurality of users in a computer network comprising:
   creating a plurality of user accounts, each of the user accounts corresponding to one of the plurality of users, and having a plurality of interactive features including a first feature that permits the user to upload the multi-media content to the computer network;

forming a user network including one or more of the plurality of user accounts in communication with one or more other user accounts and to the uploaded multi-media content via the computer network;

categorizing the uploaded multi-media content in accordance with the subject matter of the uploaded multi-media content;

organizing the uploaded multi-media content in a competitive format; and establishing a hierarchy for the uploaded multi-media content within the competitive format as a function of a competitive measurement system;

wherein the competitive measurement system comprises:

enabling the users, over a first time period, to designate a single point to one of a plurality of multimedia content for each one of a plurality of competitive rounds; and ranking a position in the hierarchy for the uploaded multi-media content based on the gathered rating measures a summation of points.

2. The method of claim 1, further comprising providing a user interface for the users to access the user accounts within the user network, the user interface including a first interactive area for selecting from the uploaded multi-media content and a second interactive area for viewing the selected multi-media content.

3. The method of claim 2, wherein the user interface includes a third interactive area for displaying one or more product advertisements.

4. The method of claim 1, wherein the first time period comprises a first round in a plurality of rounds in a competition.

5. The method of claim 1, wherein the users access the user network using one or more computing devices selected from a computer, a mobile phone, a personal data assistant (PDA), and a television.

6. A method of facilitating an online contest within a computer network comprising:

creating a plurality of user accounts, each of the user accounts corresponding to one of the plurality of users, and having a plurality of interactive features including a first feature that permits the user to upload the multi-media content to the computer network;

providing a user interface for the users to access the first interactive feature, the user interface including an embedded multi-media player adapted for viewing the uploaded multi-media content;

categorizing the uploaded multi-media content in accordance with the subject matter of the uploaded multi-media content;

organizing the uploaded multi-media content in a competitive format having a plurality of competitive rounds based on the quantity of multi-media content being organized; and applying a competitive measurement system to advance particular uploaded multimedia through the plurality of competitive rounds;

wherein the competitive measurement system consists of:

enabling the users, over a first time period, to designate a single point to one of a plurality of multimedia content for each one of a plurality of competitive rounds; and ranking a position in the hierarchy for the uploaded multi-media content based on the gathered rating measures a summation of points.

7. The method of claim 6, wherein the embedded multi-media player includes a video viewer, an audio player, and a picture viewer.

8. The method of claim 6, wherein the embedded multi-media player includes one or more interactive portals that has a first portal that permits a first user to communicate with others of the users on the user network.

9. The method of claim 8, wherein the first portal transmits electronic messages.

10. The method of claim 9, wherein the embedded multi-media player includes one or more interactive portals selected from a second portal that permits the first user to purchase one or more items, a third portal that permits the first user to transfer the uploaded multi-media content to a computing device, and a fourth portal that permits the first user to navigate within the user network.

11. The method of claim 6, wherein the first time period comprises a first round in one the plurality of competitive rounds in the competition.

12. The method of claim 11, wherein such first round comprises a head-to-head competition.

13. The method of claim 6, wherein the users access the user network using one or more computing devices selected from a computer, a mobile phone, a personal data assistant (PDA), and a television.

* * * * *